March 5, 1940.     R. M. CRITCHFIELD     2,192,434
METHOD OF MANUFACTURE
Filed May 22, 1939

INVENTOR
Robert M. Critchfield
BY
Spencer Hardman & Fehr
his ATTORNEYs

Patented Mar. 5, 1940

2,192,434

UNITED STATES PATENT OFFICE 2,192,434

METHOD OF MANUFACTURE

Robert M. Critchfield, Anderson, Ind., assignor to General Motors Corporation, Detroit, Mich., a corporation of Delaware Application May 22, 1939, Serial No. 274,991

1 Claim. (Cl. 29—159.2)

This invention relates to engine starter drives and particularly to the outside cam overrunning clutch drive described and claimed in the copending application of R. M. Critchfield, Serial No. 223,239, filed August 5, 1938.

The drive disclosed in the Critchfield application comprises a tubular sleeve which is internally longitudinally splined to the armature shaft of a series electric motor. This sleeve supports an annular plate attached at its periphery to a clutch shell which provides clutch cams exterior to the clutch rollers and to the cylindrical inner member of the clutch which is secured to a pinion slidable along the armature shaft into and out of mesh with the fly wheel gear of the engine to be started.

The present invention is concerned particularly with the method of making the assembly of sleeve, annular plate and clutch shell. Since the clutch shell provides the clutch cams, the clutch shell must be subjected to a heat treatment which will harden the cam surfaces. It is more particularly an object of the invention to provide a method of attaching the clutch shell to the annular plate of the sleeve which can be carried out in a manner which will not interfere with the proper heat treatment of the clutch shell, and which provides an attachment which the final heat treatment of the shell will not loosen.

Further objects and advantages of the present invention will be apparent from the following description, reference being had to the accompanying drawing wherein a preferred embodiment of the present invention is clearly shown.

Figure 1:
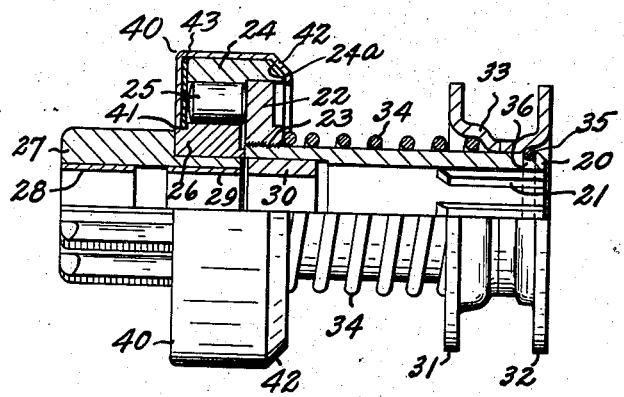
Fig. 1 is in part a side view and in part a longitudinal sectional view of a starter drive in which certain parts are assembled in accordance with the present invention.

With reference to Fig. 1, I shall describe first a starter drive assembly. It includes a sleeve 20 provided with longitudinal splines 21 adapted to fit with similar longitudinal splines provided on the armature shaft or other shaft driven by the electric starting motor. The sleeve 20 is united with an annular plate 22 preferably by copper brazing indicated at 23. In a manner to be described in detail hereinafter, the plate 22 is attached to a shell 24 which provides the clutch cams of an overrunning roller clutch. Rollers indicated at 25 are confined between the shell 24 and a cylindrical member 26, which is united with the starter pinion 27 by copper brazing. The bore of the pinion 27 receives bearing bushings 28 and 29 in alignment with a bearing bushing 30 carried by the sleeve 20. Bushings 28, 29 and 30 have such internal diameters as to provide a sliding fit with a portion of the shaft driven by the motor along which the starter drive slides. After the bushings 28 and 29 have been assembled within the bore of the pinion 27, the outer surface of the cylindrical member 26 is ground concentric with the inner surfaces of the bearings 28 and 29.

The starter drive is moved longitudinally along the electric motor driven shaft by a pedal operated mechanism (not shown) which includes a forked lever carrying pins which are received between the flanges 31 and 32 of a shifting collar 33 which is slidable along the exterior of the sleeve 20. Between the plate 22 and the sleeve 33 is located a helical coil spring 34 which is confined in a state of initial compression by reason of the fact that the collar 33 is held in the position shown in Fig. 1 by a split wire snap ring 35 received within a groove 36 provided at the right hand end of the sleeve 20.

The inner or driven member of the overrunning clutch, namely the cylindrical member 26 attached to the pinion 27, together with the clutch rollers 25 are maintained in assembled relation with the clutch shell or driving member 24 by a retainer 40 having a configuration resembling a shallow cup, the flat wall of which is provided with an opening 41 to receive the clutch inner member 26. The flange portion 42 of the retainer 40 is formed around a beveled portion 24a of the shell 24 in order to maintain the parts in assembled relation. A washer 43 is located between the flat portion of the retainer 40 and the left hand side of the shell 24. This washer is clamped between the flat portion of the retainer 40 and the end face of the shell 24, but the construction is such that the rollers 25 and the clutch inner member 26 are free to turn.

The advantages of this outside cam overrunning clutch construction are pointed out in detail in the Critchfield application referred to.

Figure 2:
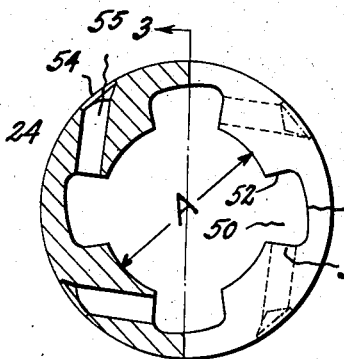
Fig. 2 is in part a left hand face view and in part a cross sectional view of the clutch shown in Fig. 1 and in section at Fig. 3.
Figure 3:
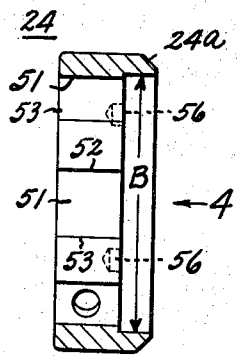
Fig. 3 is a sectional view of the clutch shell on the section line 3—3 of Fig. 2.
Figure 4:
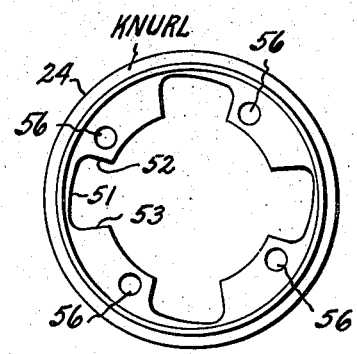
Fig. 4 is a right hand face view of the clutch shell looking in the direction of the arrow 4 of Fig. 3.
Figure 5:
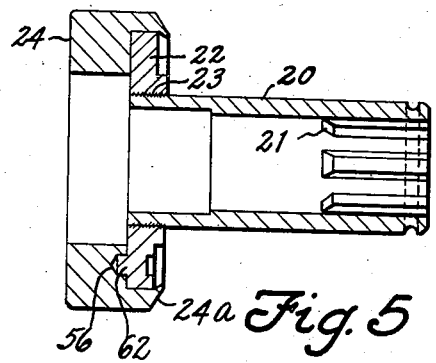
Fig. 5 is a longitudinal sectional view of the sleeve plate and shell assembly taken on the section of line 5—5 of Fig. 6.

I will now describe the making of the clutch shell prior to its assembly with the sleeve and plate assembly which includes sleeve 20 in plate 22. Referring to Figs. 2, 3 and 4, the blank for the shell 24 is formed from round stock on an automatic machine which drills, bores and reams the center opening having the diameter A indicated in Fig. 2. Then the blank is counterbored with the diameter B indicated in Fig. 3. The blank is beveled at 24a. Then the blank is cut from the round stock and is inspected, washed and copper plated. The blank is then broached to provide the notches 50 which are defined by cam surfaces 51 and end surfaces 52 and 53. The broaching removes metal which has been copper plated leaving the exposed surfaces 51, 52 and 53 without copper plating. This is necessary so that only these surfaces will be carburized while other surfaces protected by the copper plating will not become carburized during a subsequent treatment.

The shell 24 is drilled radially to provide shallow holes 54 which facilitate the drilling of the somewhat tangential holes 55 which provide pockets for receiving springs which urge plungers against the clutch rollers 25. These springs and plungers are not shown as it is understood by those skilled in this art that the plungers are employed to urge the rollers 25 each toward that portion of the cam surface 51 which is nearest to the axis of the clutch. In other words, these plungers are urged by the springs so as to wedge the rollers 25 between the cylindrical inner member 26 and the clutch cams 51. The shell 24 is then provided with shallow holes 56 for a purpose to be described later. The shell 24 is then subjected to a carburizing process during which those surfaces 51, 52 and 53 are not protected by copper plating and are penetrated by carbon presented by the carburizing process.

Figure 6:
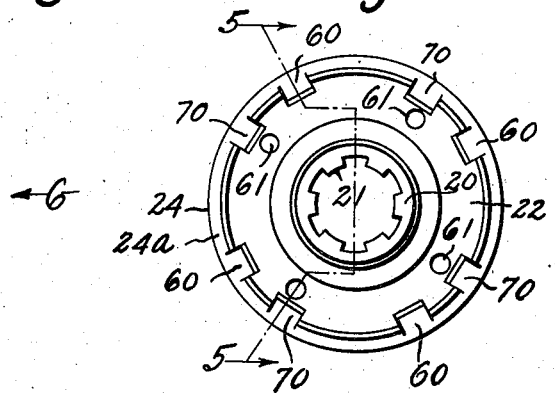
Fig. 6 is an end view taken in the direction of the arrow 6 of Fig. 5 of the sleeve plate and shell assembly.

The shell 24 is now ready to be assembled with the sleeve and plate assembly comprising sleeve 20 and plate 22 which have been previously united by copper brazing indicated at 23. The plate 22 fits within the counterbore B of shell 24. The shell 24 and the plate 22 are united by staking the shell at the places indicated by numeral 60 and by depressing those portions 61 of the plate 22 which are in alignment with the holes 56 of shell 24 so as to form squirts 62 which fill the holes 56 and thus prevent any angular displacement of the plate 22 with respect to the shell 24. At this time the splines 21 of the sleeve 20 are broached so that they will be concentric with respect to the bore A of shell 24 and consequently with respect to clutch cams 51. This assembly is then given a cyanide treatment and a heat treatment which results in the hardening of the surfaces 51, 52, 53 and a tempering of the metal contiguous to those surfaces so that this metal will be hard and tough but not brittle. Following the heat treatment the assembly is restaked at the parts 60 which were staked before and at four additional places marked 70 in Fig. 6.

From the foregoing description of the method of making and assembling the clutch shell 24 with the plate 22 of the plate and sleeve assembly, it is apparent that the method that I have provided does not interfere with heat treatment of the shell after assembly and that the heat treatment still permits a final staking operation to take place. What I have done is to provide means for uniting the shell with the plate in such a manner as to prevent any axial or angular displacement thereof after assembly. This angular displacement is prevented by the squirts 62 of the plate being received by the shallow drill holes 56 of the shell 24. This manner of uniting the parts takes place before the heat treatment of shell 24. The plate 22 and shell 24 are united before heat treatment of shell 24 to prevent axial separation thereof by means of staking at the places indicated at 60. The subsequent heat treatment of the assembly may sometimes tend to loosen the fit between the outer periphery of the plate 22 and the counterbore B of the shell 24. However, after heat treatment, that portion of the shell 24 adjacent the periphery of the plate 22 is still sufficiently tough and ductile to permit staking again at the places 60 and at the additional places 70.

Before the retainer member 40 is assembled and after the pinion assembly has been assembled together with the rollers 25, with the shell plate and sleeve assembly, the spaces within this assembly are packed with grease and then the washer 43 and the retainer 40 are assembled.

While the embodiment of the present invention as herein disclosed, constitutes a preferred form, it is to be understood that other forms might be adopted, all coming within the scope of the claim which follows.

What is claimed is as follows:

The method of treating and assembling parts of an overrunning clutch having a shell which provides the clutch cams and provided with a counterbore adapted to receive a disc or plate which supports the shell coaxially with respect to a shaft which includes the step of machining the shell to provide a central opening, a counterbore, holes in the flat end face of the counterbore and a deformable flange surrounding the counterbore, the step of copper plating the shell, the step of broaching the clutch shell to provide the clutch cams, the step of assembling the plate within the counterbore of the clutch shell, the step of extruding portions of the plate into the holes provided in the flat end face of the counterbore in the clutch shell, the step of preliminary staking the deformable flange of the clutch shell against the outer edge of the plate, the steps of hardening and tempering the clutch shell, and the step of final staking the deformable flange of the clutch shell against the plate.

ROBERT M. CRITCHFIELD.